United States Patent [19]

Mukainakano et al.

[11] Patent Number: 5,109,155
[45] Date of Patent: Apr. 28, 1992

[54] SEMICONDUCTOR IMAGE SENSOR WITH AN INTEGRATED VOLTAGE REGULATOR

[75] Inventors: Hiroshi Mukainakano; Yukito Kawahara; Satoshi Machida, all of Tokyo, Japan

[73] Assignee: Seiko Instruments Inc., Japan

[21] Appl. No.: 557,089

[22] Filed: Jul. 23, 1990

[30] Foreign Application Priority Data

Jul. 25, 1989 [JP] Japan .................. 1-193496

[51] Int. Cl.⁵ ............................................ H01J 40/14
[52] U.S. Cl. ......................... 250/208.1; 358/213.11
[58] Field of Search ............... 250/208.1, 208.2, 578.1, 250/214 R; 358/213.11, 213.15, 213.19, 213.26, 213.18

[56] References Cited

U.S. PATENT DOCUMENTS

| | | | |
|---|---|---|---|
| 4,644,403 | 2/1987 | Sakai et al. | 358/213.15 |
| 4,788,595 | 11/1988 | Tamada et al. | 358/213.11 |
| 4,797,560 | 1/1989 | Berger et al. | 358/213.11 |
| 4,847,489 | 7/1989 | Dietrich | 250/208.1 |
| 4,868,405 | 9/1989 | Nakamura | 358/213.11 |

Primary Examiner—David C. Nelms
Assistant Examiner—Que T. Le
Attorney, Agent, or Firm—Bruce L. Adams; Van C. Wilks

[57] ABSTRACT

The semiconductor image sensing device is comprised of a single crystal substrate of one conductivity type, formed thereon with an array of photodetector 5 for effecting photo-electric conversion, a read-out circuit for sequentially reading out an output signal from each photodetector, an amplifier for voltage-converting the read output signal, and a voltage regulator for providing a constant voltage. The read-out circuit and the photodetectors are driven by a lower voltage supplied from the integrated voltage regulator so as to reduce a switching noise generated in the read-out circuit. S/N ratio of the semiconductor image sensor is improved by reducing the switching noise. Further, the power consumption can be saved by driving the read-out circuit at the lower voltage.

5 Claims, 2 Drawing Sheets

SEMICONDUCTOR IMAGE SENSOR WITH AN INTEGRATED VOLTAGE REGULATOR

BACKGROUND OF THE INVENTION

The present invention relates to a semiconductor image sensor for receiving reflected light from an image source illuminated by incident light to convert the received light into a corresponding electric signal.

FIG. 2 is a circuit diagram showing the conventional semiconductor image sensing device. Incident light to the semiconductor image sensor is converted into a corresponding electric signal by an array 1 of photodetecting elements. However, the electric signal converted by the array 1 of photodetectors is rather weak and therefore may be affected by noise generated by a read-out circuit 2. In the circuit 2, each analog switch is formed of a MOS transistor TGn and an inverter In, hence it causes due to parasitic capacitance between gate and drain during transitional response a spike noise which imparts change in a signal of corresponding photodetector Sn. This noise increases when the MOS transistor TGn is driven by higher power source voltage.

There is generally utilized a technology where the electric signal from the array 1 of photodetectors is voltage-converted so as to avoid reduction of output due to external load capacitance and external load resistance.

The voltage-convertion is generally carried out by a source follower circuit or operational amplifier.

However, the operational amplifier needs a wide dynamic range in order to transfer the signal output from the photodetector without its distortion. The dynamic range of the operational amplifier varies depending on magnitude of the power source voltage. The higher the power source voltage, the wider the dynamic range. On the other hand, when increasing the power source voltage of the read-out circuit, a large noise is superposed on a signal line through parasitic capacitance and gate-drain capacitance as described above to thereby reduce S/N ratio. Namely, in the conventional semiconductor image sensing device, when the power source voltage is set higher, the noise increases. When the power source voltage is set lower, the dynamic range is reduced to hinder performance.

SUMMARY OF THE INVENTION

In order to solve the above noted problem, an object of the present invention is to power and drive the operational amplifier and the read-out circuit by two different power source voltages. The operational amplifier is driven by the higher one of the two power source voltages. The read-out circuit and the photodetecters are supplied with the lower one of the two power source voltages, which is obtained from a voltage regulator formed on the same single crystal substrate. The voltage regulator is powered by the higher power source voltage which is provided for the operational amplifier, such that the semiconductor image sensor itself is operated by a single power source as a whole. The voltage regulator is formed on a semiconductor substrate without changing any fabrication process.

As described above, the photodetectors, read-out circuit, operational amplifier and voltage regulator are formed on the common single crystal substrate to obtain a semiconductor image sensor having wide dynamic range and high S/N ratio. The read-out circuit is driven by a power source voltage lower than that in the conventional device to thereby reduce current consumption.

DETAILED DESCRIPTION OF THE INVENTION

Figure 1:
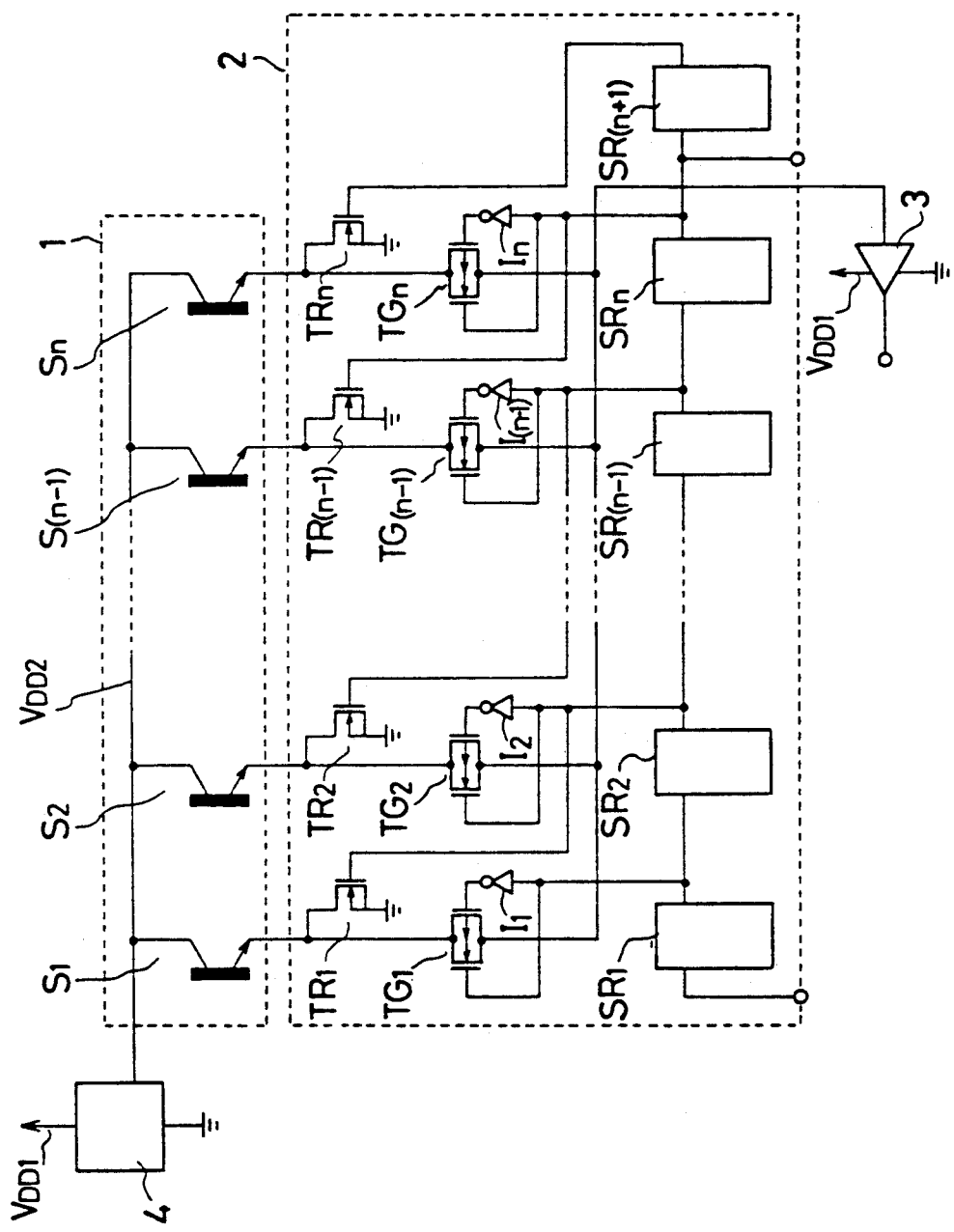
FIG. 1 is a circuit diagram showing an embodiment of the inventive semiconductor image sensor.
Figure 2:
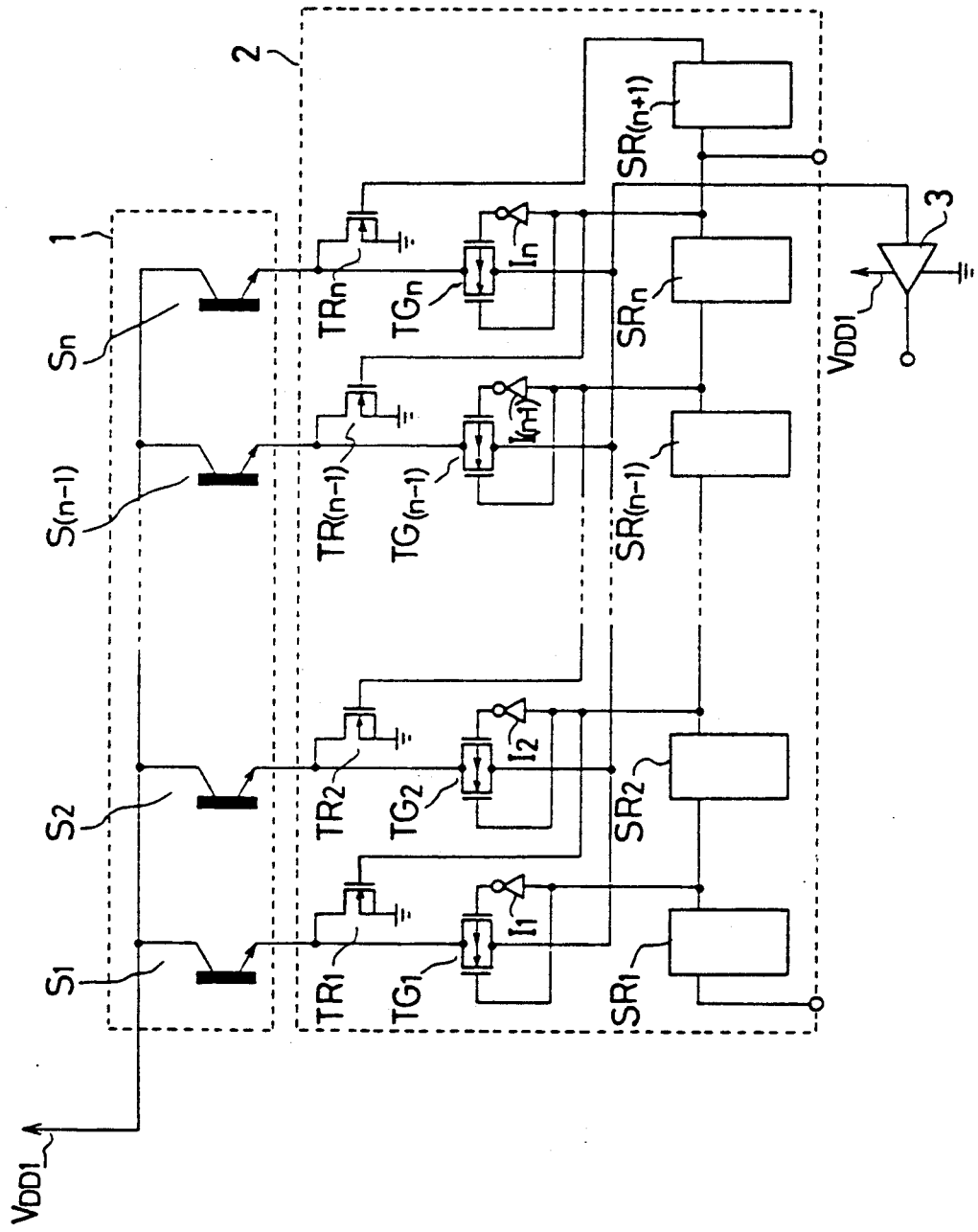
FIG. 2 is a circuit diagram showing the conventional semiconductor image sensor.

Hereinafter, an embodiment will be described in detail according to the present invention. FIG. 1 is a circuit diagram showing one embodiment of the inventive semiconductor image sensor. An array 1 of photodetectors in the form of phototransistors, a read-out circuit 2, an operational amplifier 3 and a voltage regulator 4 are formed on a common single crystal semiconductor substrate of one conductivity type. The read-out circuit 2 is comprised of reset transistors TRn, transmission gates TGn with inverters In and shift registers SRn. Each reset transistor TRn operates to reset a corresponding photodetector at a constant voltage.

Reading of the signal is carried out as follows. Namely, a signal of the first photodetector $S_1$ is outputted through the corresponding transmission gate $TG_1$ which is placed in operating condition upon receipt of command data in the first shift register $SR_1$. The outputted signal is amplified by the operational amplifier 3 and is then fed out externally. The data of the first shift register $SR_1$ is shifted to a subsequent stage so as to sequentially read out a signal from each photodetector. The integrated voltage regulator 4 supplies a power source voltage $V_{DD2}$ to the read-out circuit and to the array of the photodetectors. The voltage regulator 4 is driven or powered by another power source voltage $V_{DD1}$, which can be also commonly used to power the operational amplifier 3. Therefore, the semiconductor image sensing device can be supplied with a single power source voltage $V_{DD1}$ where $V_{DD1} > V_{DD2}$.

The read-out circuit is comprised of CMOS transistors in the embodiment. Otherwise, the read-out circuit can be composed of bipolar transistors. Further, the operational amplifier 3 and voltage regulator 4 can be formed of CMOS transistors or bipolar transistors. Consequently, the inventive device can be manufactured without changing the conventional semiconductor fabrication process to avoid addition of a fabrication step.

As described above, according to the present invention, the driving voltage of the read-out circuit is reduced to suppress the noise of signal line and to obtain high S/N ratio, thereby obtaining advantageous semiconductor image sensor having lower current consumption and wide dynamic range.

What is claimed is:

1. A semiconductor image sensing device formed on a common semiconductor substrate of one conductivity type, comprising:
   an array of photodetecting elements;
   a read-out circuit for sequentially reading out an output signal from each photodetecting element;
   an amplifying circuit for voltage-converting the read output signal;
   and a voltage regulator for applying a constant voltage effective to drive the read-out circuit, wherein the voltage regulator is powered by a voltage higher than the constant voltage and wherein the amplifying circuit is powered by the higher voltage.

2. The device as claimed in claim 1, wherein the array of photodetecting elements is connected to be driven by the constant voltage.

3. A semiconductor image sensing device formed on a common semiconductor substrate of one conductivity type, comprising:

an array of photodetecting elements each producing an output signal;

reading means for sequentially reading out the output signals from the photodetecting elements;

an amplifying circuit powered by a first voltage and receptive of the read out output signals for amplifying the output signals; and voltage regulating means powered by the first voltage for producing a constant voltage lower in value than the first voltage and for applying the constant voltage to the reading means to drive the same.

4. The device according to claim 3, wherein the voltage regulating means is connected to apply the constant voltage to the array of photodetecting elements to drive the same.

5. The device according to claim 4, wherein the amplifying circuit comprises an operational amplifier.

* * * * *